(12) United States Patent
Shim et al.

(10) Patent No.: US 8,896,790 B2
(45) Date of Patent: Nov. 25, 2014

(54) LIQUID CRYSTAL DISPLAY WITH OPPOSING PROTRUSIONS IN A PIXEL

(75) Inventors: Yi-Seop Shim, Suwon-si (KR); Dong-Yoon Lee, Seoul (KR); Tae-Gee Min, Seoul (KR); Seong-Gyu Kwon, Suwon-si (KR); Jae-Hoon Kim, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 404 days.

(21) Appl. No.: 12/481,860

(22) Filed: Jun. 10, 2009

(65) Prior Publication Data

US 2010/0157235 A1 Jun. 24, 2010

(30) Foreign Application Priority Data

Dec. 23, 2008 (KR) .................... 10-2008-0132432

(51) Int. Cl.
  *G02F 1/1335* (2006.01)
  *G02F 1/1339* (2006.01)
  *G02F 1/1362* (2006.01)

(52) U.S. Cl.
  CPC .......... *G02F 1/133516* (2013.01); *G02F 2001/136222* (2013.01); *G02F 1/13394* (2013.01)
  USPC ........................................... 349/106

(58) Field of Classification Search
  USPC ........................................... 349/155
  See application file for complete search history.

(56) References Cited

U.S. PATENT DOCUMENTS

| | | | |
|---|---|---|---|
| 6,678,031 B2 * | 1/2004 | Song | 349/155 |
| 7,279,270 B2 * | 10/2007 | Tanaka et al. | 430/322 |
| 7,423,718 B2 * | 9/2008 | Sumi | 349/155 |
| 7,751,018 B2 * | 7/2010 | Tomita et al. | 349/154 |
| 8,294,853 B2 * | 10/2012 | Matsushita | 349/106 |
| 8,363,200 B2 * | 1/2013 | Nose et al. | 349/154 |
| 8,508,708 B2 * | 8/2013 | Tomita et al. | 349/157 |
| 2002/0039166 A1 * | 4/2002 | Song | 349/156 |
| 2003/0031942 A1 * | 2/2003 | Elizur et al. | 430/7 |
| 2003/0164681 A1 * | 9/2003 | Fukuoka et al. | 313/512 |
| 2004/0229139 A1 * | 11/2004 | Tanaka et al. | 430/7 |
| 2005/0024567 A1 * | 2/2005 | Sawasaki et al. | 349/123 |
| 2005/0157157 A1 * | 7/2005 | Tsukamoto et al. | 347/213 |
| 2007/0031742 A1 * | 2/2007 | Hamawaki et al. | 430/7 |

(Continued)

FOREIGN PATENT DOCUMENTS

| | | |
|---|---|---|
| JP | 2003-167245 | 6/2003 |
| JP | 2007-163536 | 6/2007 |
| JP | 2007-225748 | 9/2007 |
| JP | 2009093164 A * | 4/2009 |

*Primary Examiner* — Mark Robinson
*Assistant Examiner* — Andrew Jordan
(74) *Attorney, Agent, or Firm* — H.C. Park & Associates, PLC

(57) ABSTRACT

A liquid crystal display according to an exemplary embodiment of the present invention includes: a substrate; a partition formed on the substrate and defining a pixel; a plurality of protrusion members formed with the same material as the partition on the substrate, and disposed with a linear plane shape inside the pixel defined by the partition; and a color filter filled inside the pixel defined by the partition. Accordingly, in the liquid crystal display according to an exemplary embodiment of the present invention, a plurality of transparent protrusion members are formed in the pixel defined by the partition such that movement of color filter ink dripped through an Inkjet method is controlled such that a color filter may be planarized on the whole surface of the pixel.

20 Claims, 13 Drawing Sheets

(56) References Cited

U.S. PATENT DOCUMENTS

| | | |
|---|---|---|
| 2007/0242179 A1* | 10/2007 | Song et al. .................. 349/43 |
| 2008/0023177 A1 | 1/2008 | Hassett et al. |
| 2008/0030658 A1* | 2/2008 | Matsuhita .................. 349/106 |
| 2008/0230754 A1* | 9/2008 | Takiguchi et al. ........... 252/586 |
| 2008/0231778 A1 | 9/2008 | Tsao et al. |
| 2009/0015765 A1* | 1/2009 | Takiguchi et al. ........... 349/106 |
| 2009/0073356 A1* | 3/2009 | Moriyama et al. ........... 349/106 |
| 2009/0128612 A1* | 5/2009 | Sano .......................... 347/106 |
| 2009/0201448 A1* | 8/2009 | Song .......................... 349/98 |
| 2010/0157235 A1* | 6/2010 | Shim et al. .................. 349/155 |

* cited by examiner

LIQUID CRYSTAL DISPLAY WITH OPPOSING PROTRUSIONS IN A PIXEL

CROSS REFERENCE TO RELATED APPLICATION

This application claims priority from and the benefit of Korean Patent Application No. 10-2008-0132432, filed on Dec. 23, 2008, which is hereby incorporated by reference for all purposes as if fully set forth herein.

BACKGROUND OF THE INVENTION

1. Field of the Invention

The present invention relates to a liquid crystal display.

2. Discussion of the Background

Currently, various flat panel displays are being developed. Among them, a liquid crystal display is widely used as a flat panel display.

The liquid crystal display (LCD) is one of the most commonly used flat panel displays, and it includes two substrates with electrodes formed thereon and a liquid crystal layer interposed between the two substrates. In the LCD, a voltage is applied to the electrodes to realign liquid crystal molecules of the liquid crystal layer to thereby regulate the transmittance of light passing through the liquid crystal layer.

The liquid crystal display also may include a color filter displaying a color by using the light transmitted through the liquid crystal layer, and the color filter is generally disposed in a display panel formed with a common electrode.

The color filter commonly includes red, green, and blue colors such that each color filter must be aligned to face a corresponding pixel when aligning the two display panels. However, because the area of a light blocking member defining openings corresponding to the pixels must be sufficiently wide considering a misalignment margin, the size of the openings is decreased such that the aperture ratio of the pixels may be reduced.

To solve the problem, techniques in which the color filters are formed through an inkjet method have been provided. Forming the color filters through the inkjet method also simplifies the manufacturing process, because a light exposer is not used.

However, the inkjet method uses ink of a liquid state such that the thickness of the color filter is different between the edge and the center of the color filter in one pixel, and thereby the surface of the color filter is not flat in one pixel. Accordingly, light leakage is generated at the edge of the color filter such that the color is different between the edge and the center of the color filter, thereby decreasing color reproducibility.

An organic layer or an overcoat is formed on the color filter for the planarization of the pixel surface, however it may not prevent generation of the light leakage due to the height difference of the color filter inside the pixel.

SUMMARY OF THE INVENTION

Exemplary embodiments of the present invention provide a planarized surface of a color filter inside a pixel to improve color reproducibility.

Additional features of the invention will be set forth in the description which follows, and in part will be apparent from the description, or may be learned by practice of the invention.

An exemplary embodiment of the present invention discloses a liquid crystal display, which includes a substrate and a partition disposed on the substrate, and the partition defines a pixel. A plurality of protrusion members are formed with the same material as the partition on the substrate. The plurality of partitions are disposed with a linear plane shape inside the pixel defined by the partition; and a color filter is filled inside the pixel defined by the partition.

An exemplary embodiment of the present invention also discloses a liquid crystal display, which includes a substrate formed with a thin film transistor and a partition disposed on the substrate and defining a pixel. A plurality of protrusion members formed with the same material as the partition on the substrate are disposed inside the pixel defined by the partition. A color filter is filled inside the pixel defined by the partition, wherein the protrusion members are not disposed at positions corresponding to the corners of the pixel defined by the partition.

An exemplary embodiment of the present invention also discloses a liquid crystal display, which includes a thin film transistor array panel including a lower substrate, a gate line extending in a first direction disposed on the lower substrate, a data line disposed on the lower substrate crossing the gate line and extending in a second direction, a thin film transistor disposed on the lower substrate, the thin film transistor having a control terminal connected to the gate line, an input terminal connected to the data line, and an output terminal, and a pixel electrode disposed on the thin film transistor. The liquid crystal display also includes a color filter array panel including an upper substrate facing the thin film transistor array panel, a partition formed with the same pattern as the gate line and the data line, disposed on the upper substrate and defining a pixel, a plurality of protrusion members disposed on the upper substrate and disposed inside the pixel defined by the partition, a color filter filled inside the pixel defined by the partition, and a common electrode disposed on the color filter. The liquid crystal display also includes a liquid crystal layer interposed between the thin film transistor array panel and the color filter array panel, wherein the protrusion members are not formed at positions corresponding to the corners of the pixel defined by the partition.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
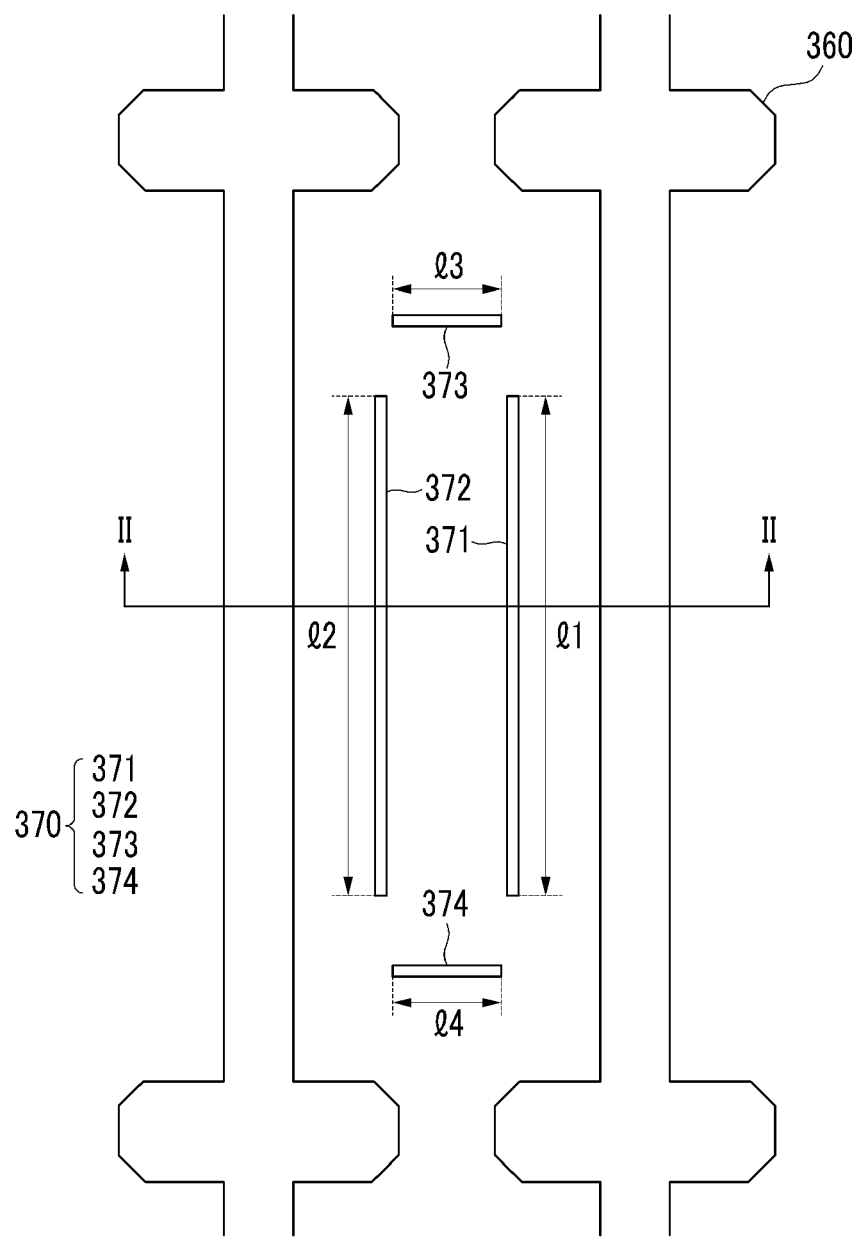
FIG. 1 is a layout view of a liquid crystal display according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

In the drawings, the thickness of layers, films, panels, regions, etc., may be exaggerated for clarity. It will be understood that when an element such as a layer, film, region, or substrate is referred to as being "on" or "connected to" another element, it can be directly on or directly connected to the other element or intervening elements may be present. In contrast, when an element is referred to as being "directly on" or "directly connected to" another element, there are no intervening elements present.

A liquid crystal display according to an exemplary embodiment of the present invention will be described with reference to FIG. 1 and FIG. 2.

Figure 2:
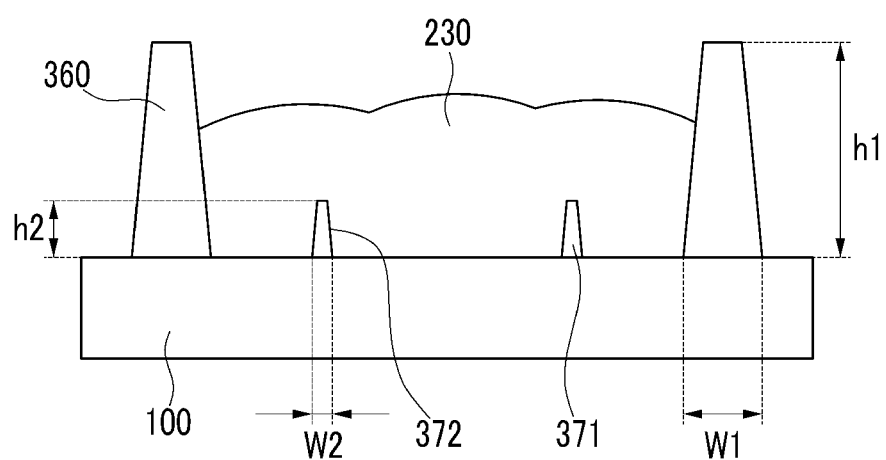
FIG. 2 is a cross-sectional view taken along line II-II shown in FIG. 1.

FIG. 1 is a layout view of the liquid crystal display according to this exemplary embodiment of the present invention, and FIG. 2 is a cross-sectional view taken along line II-II shown in FIG. 1.

Referring to FIG. 1 and FIG. 2, the liquid crystal display according to an exemplary embodiment includes a display panel 100, and a partition 360 formed on the display panel 100.

The display panel 100 may be a thin film transistor array panel formed with a thin film transistor, or may be a common electrode panel formed with a common electrode.

The partition 360 defining a pixel is formed on the display panel 100. The partition 360 may be made of a transparent organic material, and the partition 360 may have the same shape as a gate line and a data line, thereby defining the pixel.

A plurality of protrusion members 370 are formed with the same layer as the partition 360, and the protrusion members 370 may be made of a transparent organic material such as an acryl resin, a cardo resin, and a novolak resin such that the protrusion members 370 do not affect the transmittance.

The protrusion members 370 are formed inside the pixel defined by the partition 360. The protrusion members 370 include a left protrusion 372 disposed in the left side, a right protrusion 371 facing the left protrusion 372, an upper protrusion 373 disposed in the upper side, and a lower protrusion 374 facing the upper protrusion 373. The left protrusion 372, the right protrusion 371, the upper protrusion 373, and the lower protrusion 374 have a linear shape, and the pixel has a rectangular shape such that lengths 12 of the left protrusion 372 and 11 of the right protrusion 371 are longer than lengths 13 of the upper protrusion 373 and 14 of the lower protrusion 374 corresponding to the pixel.

The left protrusion 372, the right protrusion 371, the upper protrusion 373, and the lower protrusion 374 are not connected to each other. That is, the upper and lower ends of the left protrusion 372 are respectively not connected to the left ends of the upper protrusion 373 and the lower protrusion 374, and the upper and lower ends of the right protrusion 371 are respectively not connected to the right ends of the upper protrusion 373 and the lower protrusion 374. Accordingly, the protrusion members 370 are not formed at positions corresponding to the corners of the pixel.

Accordingly, the left protrusion 372, the right protrusion 371, the upper protrusion 373, and the lower protrusion 374 together form a rectangle without corners.

It is preferable that the height h2 of the protrusion members 370 is less than half the height h1 of the partition 360, and that the line width W2 of the protrusion member 370 is less than the line width W1 of the partition 360. The maximum height of the protrusion members 370 is lower than the height of the partition 360 for a color filter ink 231 dripped through an inkjet method to move over the protrusion members 370 inside the pixel. The line width W1 of the partition 360 is in a range from 20 to 30 μm, and when the height of the partition 360 is about 2 μm, it is preferable that the line width W2 of the protrusion members 370 is about 5 μm and the height h2 of the protrusion members 370 is about 0.5 μm.

Figure 3:
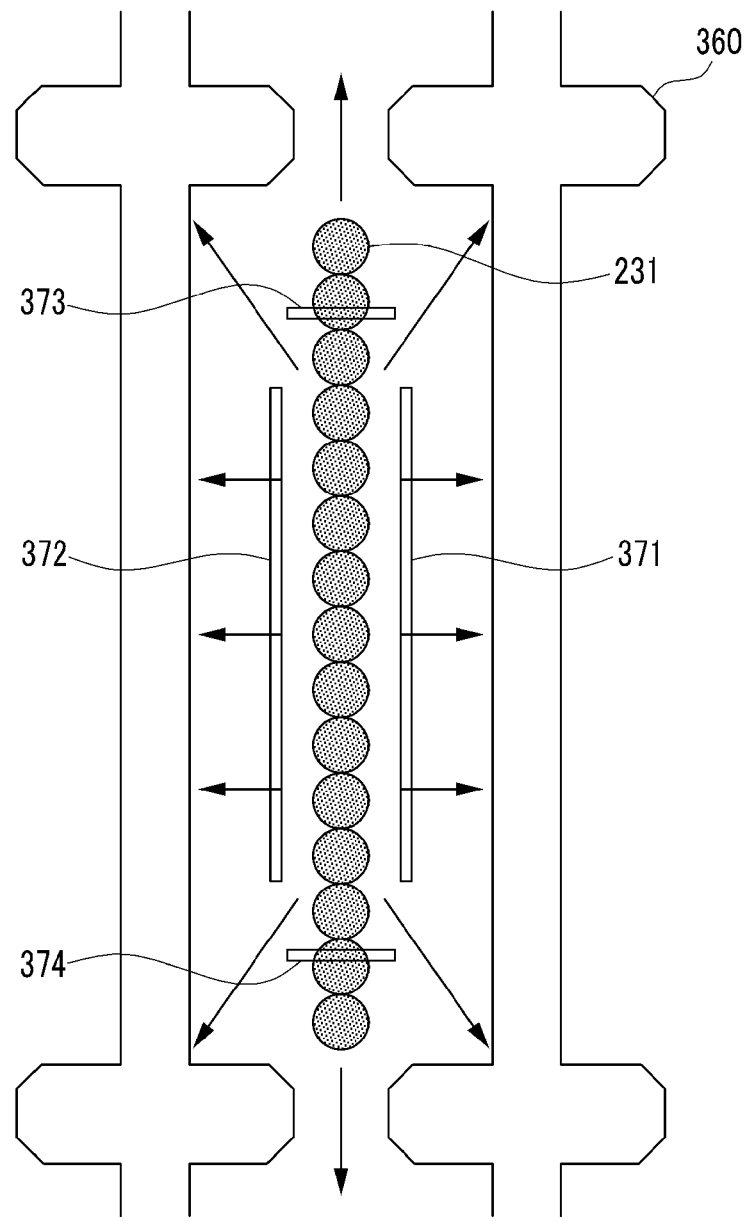
FIG. 3 is a view showing dispersion of a color filter ink when dripping a color filter ink through an inkjet method on the liquid crystal display of FIG. 1.

FIG. 3 is a view showing dispersion of a color filter ink 231 when dripping a color filter ink 231 through an inkjet method on the liquid crystal display of FIG. 1.

As shown in FIG. 3, the movement of the color filter ink 231 dripped inside the pixel through the inkjet method is limited by the protrusion members 370.

That is, the movement of the color filter ink 231 dripped on the central portion inside the pixel is restricted by the protrusion members 370 in the upper direction, the lower direction, the right direction and the left direction inside the pixel, and the movement of the color filter ink 231 is relatively unrestricted in the corner directions of the pixel where the protrusion members 370 do not exist. Also, the color filter ink 231 flows over the protrusion members 370 on the upper portion, the lower portion, the right portion, and the left portion inside the pixel, and thereby the inside of the pixel is planarized. Accordingly, the color filter ink 231 is filled with the same thickness on the whole inside of the pixel.

When the protrusion members 370 are not present, the color filter ink 231 dripped in the central portion inside the pixel is firstly moved into the upper direction, the lower direction, the right direction, and the left direction inside the pixel, and is finally filled at the corners of the pixel such that the thickness of the color filter ink 231 filled in at the corners of the pixel is decreased and a portion where the color filter ink 231 is not filled is generated. However, in an exemplary embodiment of the present invention, the protrusion members 370 are formed inside the pixel such that the amount of the color filter ink 231 filled on the right portion, the left portion, the upper portion and the lower portion, and the portions at the corners of the pixel may be equal.

The protrusion members 370 may also be formed with various shapes. Hereafter, exemplary embodiments for the various shapes of the protrusion members 370 will be described.

Figure 4:
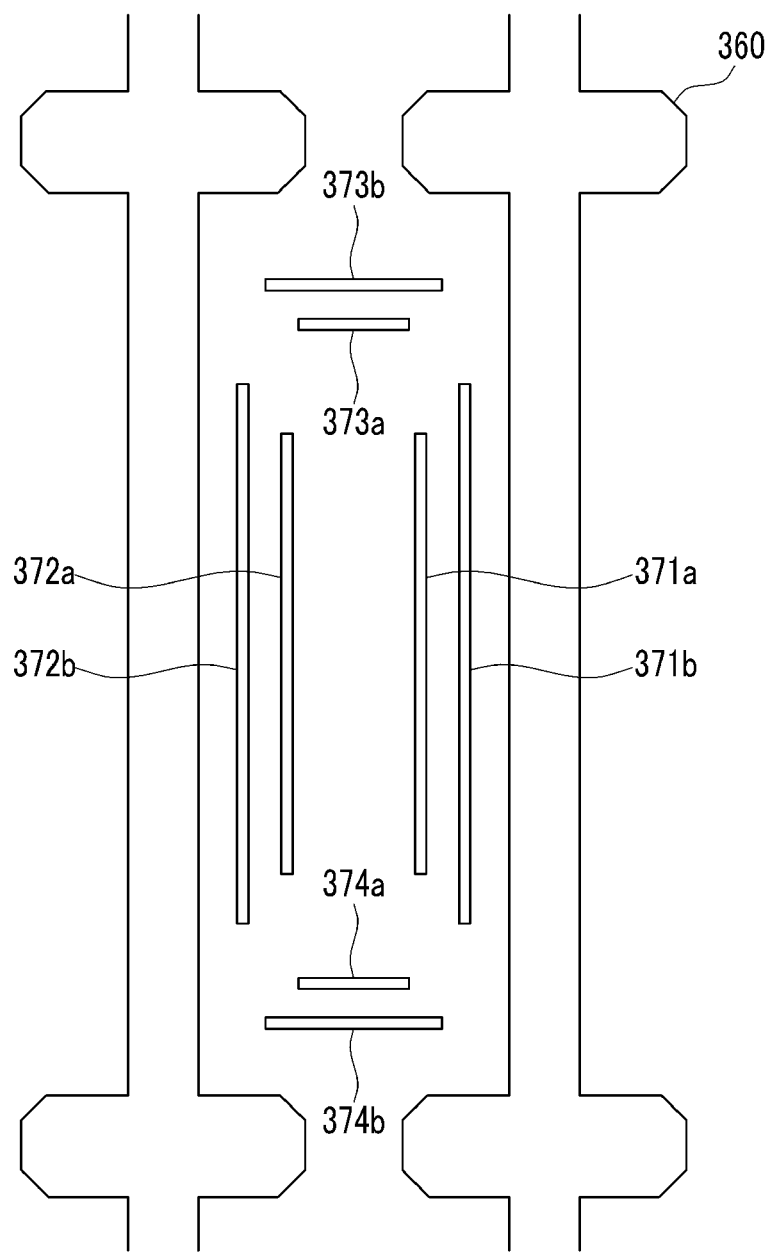
FIG. 4 is a layout view of a liquid crystal display according to another exemplary embodiment of the present invention.

FIG. 4 is a layout view of a liquid crystal display according to another exemplary embodiment of the present invention, and the shape of the protrusion members 370 is distinguished compared with the liquid crystal display of FIG. 1.

As shown in FIG. 4, each of the left protrusion 372, the right protrusion 371, the upper protrusion 373, and the lower protrusion 374 is made of a plurality of protrusions. It is preferable that the number of protrusions in each plurality of protrusions is in a range from 2 to 4, and may be controlled according to the size of the pixel. FIG. 4 shows the exemplary embodiment including the left protrusion 372, the right protrusion 371, the upper protrusion 373, and the lower protrusion 374 made of two protrusions each. The left protrusion 372 includes a first left protrusion 372a disposed inside of the pixel on the left side of the pixel and a second left protrusion 372b disposed inside the pixel, spaced apart from the first left protrusion 372b toward the left perimeter of the pixel. The right protrusion 371 includes a first right protrusion 371a disposed inside the pixel on the right side of the pixel and a second right protrusion 371b disposed inside the pixel, spaced apart from the first right protrusion 371a toward the right perimeter of the pixel. The upper protrusion 373 includes a first upper protrusion 373a disposed inside the pixel on the upper portion of the pixel and a second upper protrusion 373b disposed in the pixel, spaced apart from the first upper protrusion 373a toward the upper perimeter of the pixel, and the lower protrusion 374 includes a first lower protrusion 374a disposed inside the pixel and a second lower protrusion 374b disposed in the pixel, spaced apart from the first lower protrusion 374a toward the lower perimeter of the pixel.

It is preferable that the first left protrusion 372a is shorter at both ends than the second left protrusion 372b, the first right protrusion 371a is shorter at both ends than the second right protrusion 371b, the first upper protrusion 373a is shorter at both ends than the second upper protrusion 373b, and the first lower protrusion 374a is shorter at both ends than the second lower protrusion 374b. In this embodiment, it is easy for the color filter ink 231 to move from the central portion of the pixel to the corner portions inside the pixel such that the color filter ink 231 is filled with the same thickness in the whole pixel.

Figure 5:
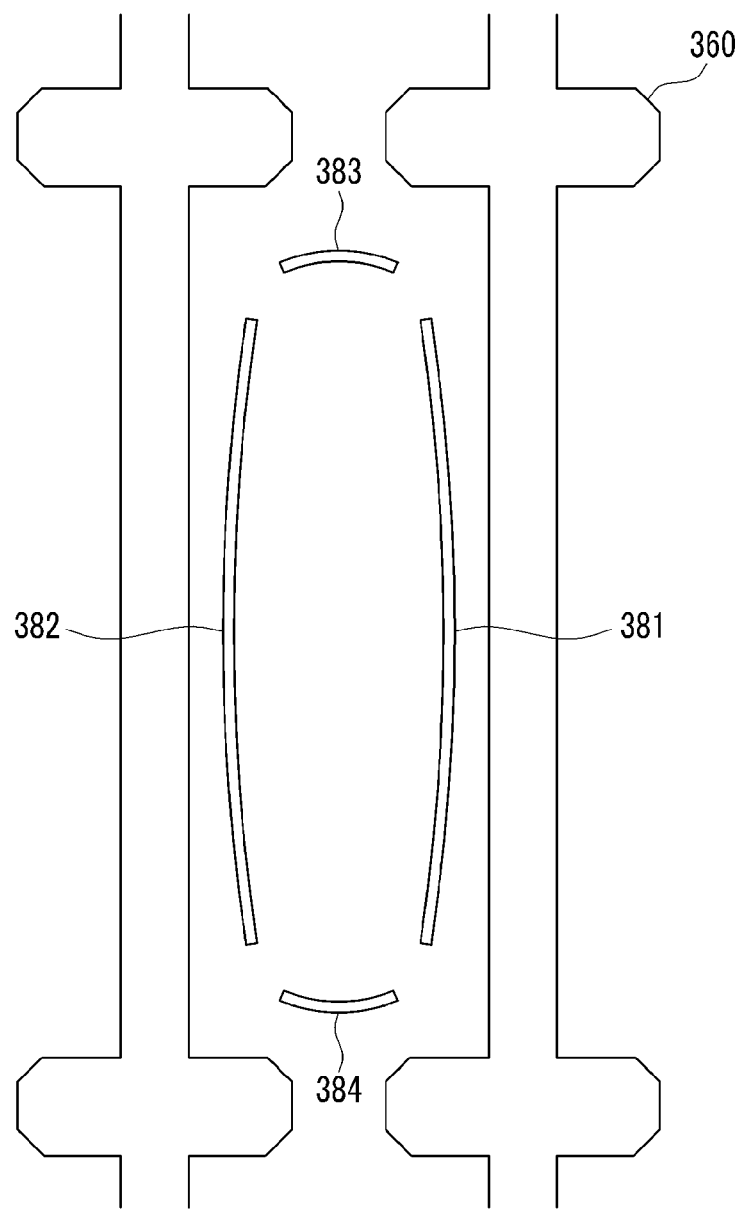
FIG. 5 is a layout view of a liquid crystal display according to another exemplary embodiment of the present invention.

FIG. 5 is a layout view of a liquid crystal display according to another exemplary embodiment of the present invention.

As shown in FIG. 5, a left protrusion 382, a right protrusion 381, an upper protrusion 383, and a lower protrusion 384 of the protrusion members 381, 382, 383, 384 have a circular arc that is convex to the outside. Here, the left protrusion 382, the right protrusion 381, the upper protrusion 383, and the lower protrusion 384 form an oval, and the protrusion members 381, 382, 383, 384 are spaced apart across openings at portions of the pixel corresponding to the corner portions of the pixel. Accordingly, the movement of the color filter ink 231 dripped on the central portion inside the pixel is restricted by the left protrusion member 382 in the left direction, the right protrusion member 381 in the right direction, the upper protrusion member 383 in the upper direction, and the lower protrusion member 384 in the lower direction, inside the pixel, and the movement of the color filter ink 231 is relatively unrestricted in the corner directions of the pixel where the protrusion members 381, 382, 383, 384 do not exist. Accordingly, the color filter ink 231 is filled with the same thickness on the whole inside of the pixel.

The left protrusion 382, the right protrusion 381, the upper protrusion 383, and the lower protrusion 384 may respectively be made of a plurality of protrusions. It is preferable that the number of protrusions is in the range from 2 to 4, and may be controlled according to the size of the pixel. Here, the protrusion of each plurality disposed toward the inside of the pixel is spaced apart from, and is shorter than the adjacent protrusion of the plurality disposed toward the perimeter of the pixel such that the color filter ink 231 may be further easily moved from the central portion to the corner portion inside the pixel.

Figure 6:
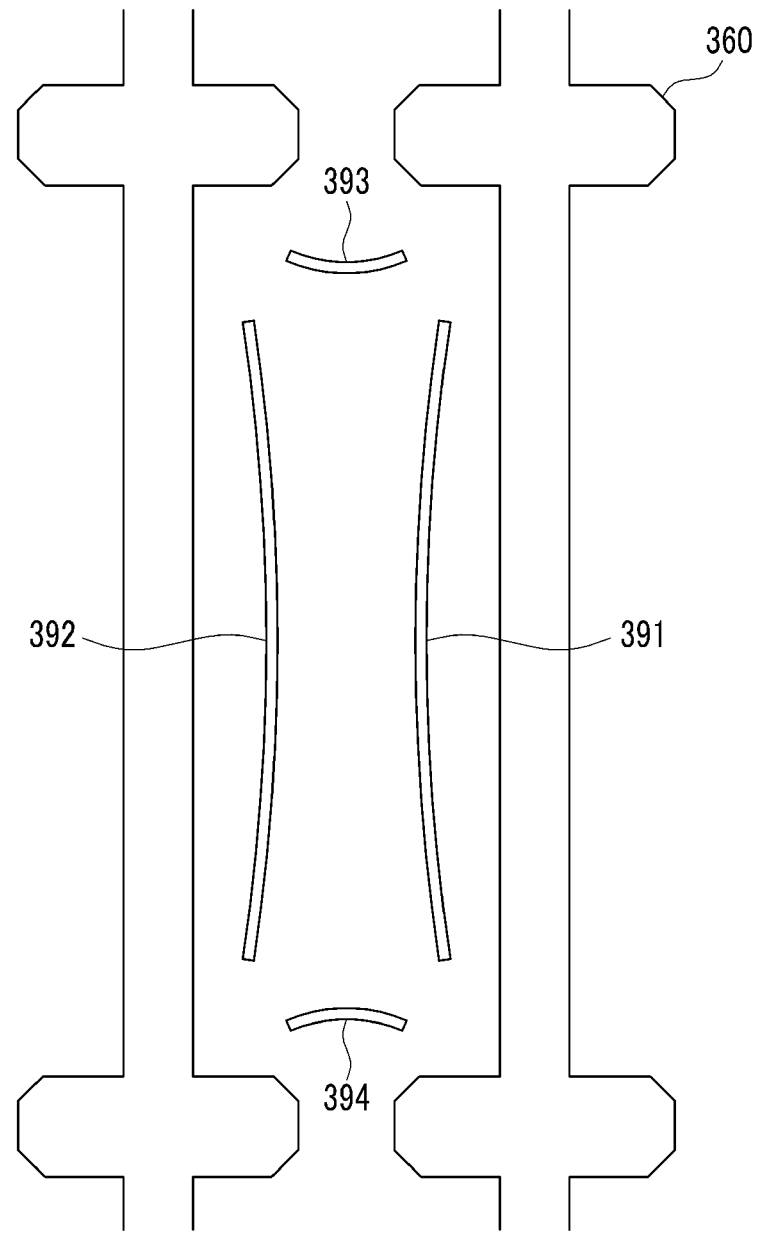
FIG. 6 is a layout view of a liquid crystal display according to another exemplary embodiment of the present invention.

FIG. 6 is a layout view of a liquid crystal display according to another exemplary embodiment of the present invention.

As shown in FIG. 6, a left protrusion 392, a right protrusion 391, an upper protrusion 393, and a lower protrusion 394 each have a circular arc that is convex to the inside. Here, the left protrusion 392, the right protrusion 391, the upper protrusion 393, and the lower protrusion 394 are not present at positions corresponding to the corners inside the pixel. Accordingly, the movement of the color filter ink 231 dripped on the central portion inside the pixel is restricted by the right protrusion 391 in the right direction, the left protrusion 392 in the left direction, the upper protrusion 393 in the upper direction, and the lower protrusion 394 in the lower direction inside the pixel, and the movement of the color filter ink 231 is relatively unrestricted and easy in the corner directions of the pixel where there is a gap in the protrusion members. Accordingly, the color filter ink 231 is filled with the same thickness on the whole inside of the pixel. Particularly, when the protrusion members 391, 392, 393, 394 are formed of the circular arc that is convex to the inside of the pixel, such that a path is formed that the color filter ink 231 is moved along into the corner portion of the pixel, and thereby the color filter ink 231 may be more easily moved from the central portion of the pixel to the inside corners of the pixel.

Also, the left protrusion 392, the right protrusion 391, the upper protrusion 393, and the lower protrusion 394 may be respectively made of a plurality of protrusions. It is preferable that the number of protrusions is in the range from 2 to 4, and may be controlled according to the size of the pixel. Here, the protrusion of each plurality disposed toward the inside of the pixel is spaced apart from, and is shorter than the adjacent protrusion of the plurality disposed toward the perimeter of the pixel such that the color filter ink 231 may be further more easily moved from the central portion of the pixel to the corner portion inside the pixel.

Now, a liquid crystal display provided with a common electrode and including the protrusion members will be described with reference to FIG. 7, FIG. 8, FIG. 9 and FIG. 10.

Figure 7:
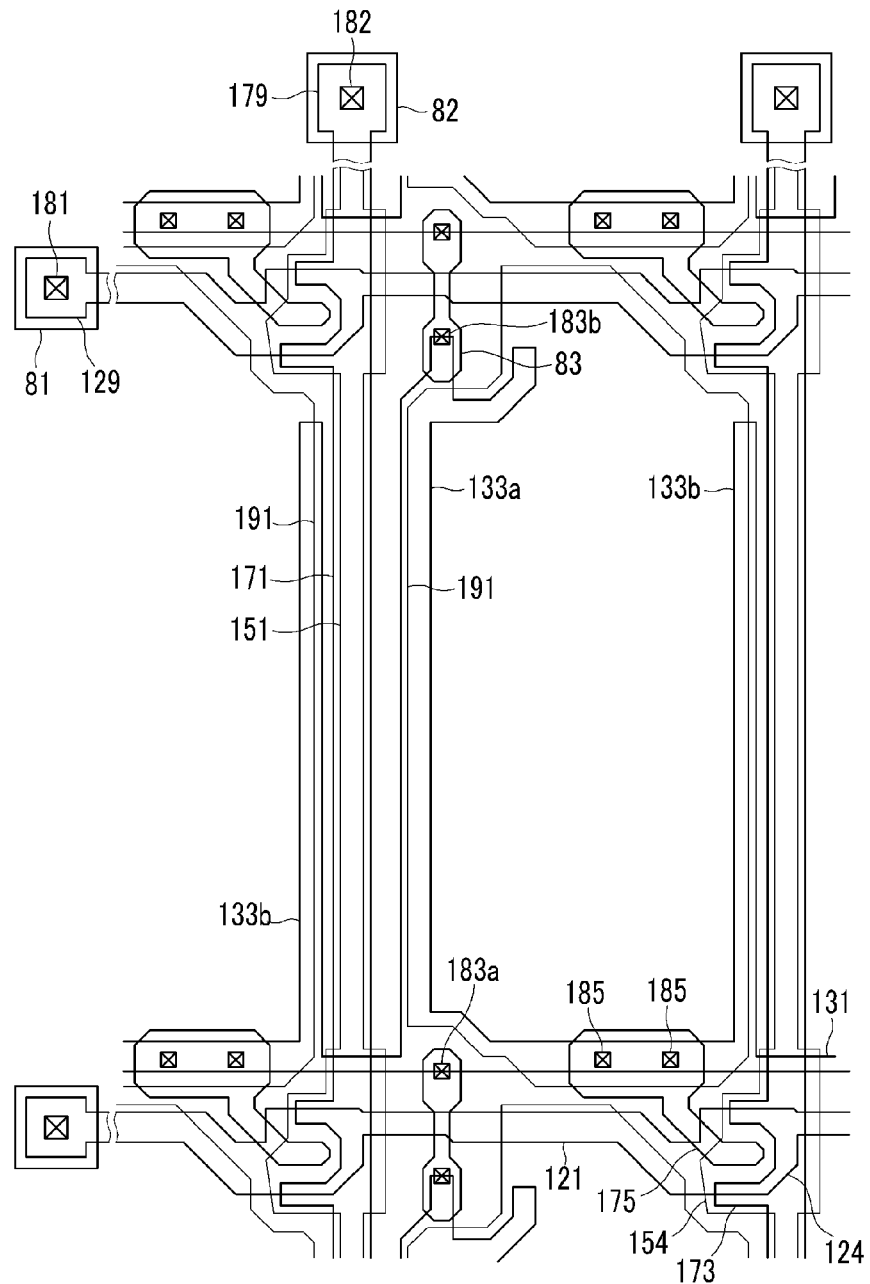
FIG. 7 is a layout view of a thin film transistor array panel of a liquid crystal display according to an exemplary embodiment of the present invention.
Figure 8:
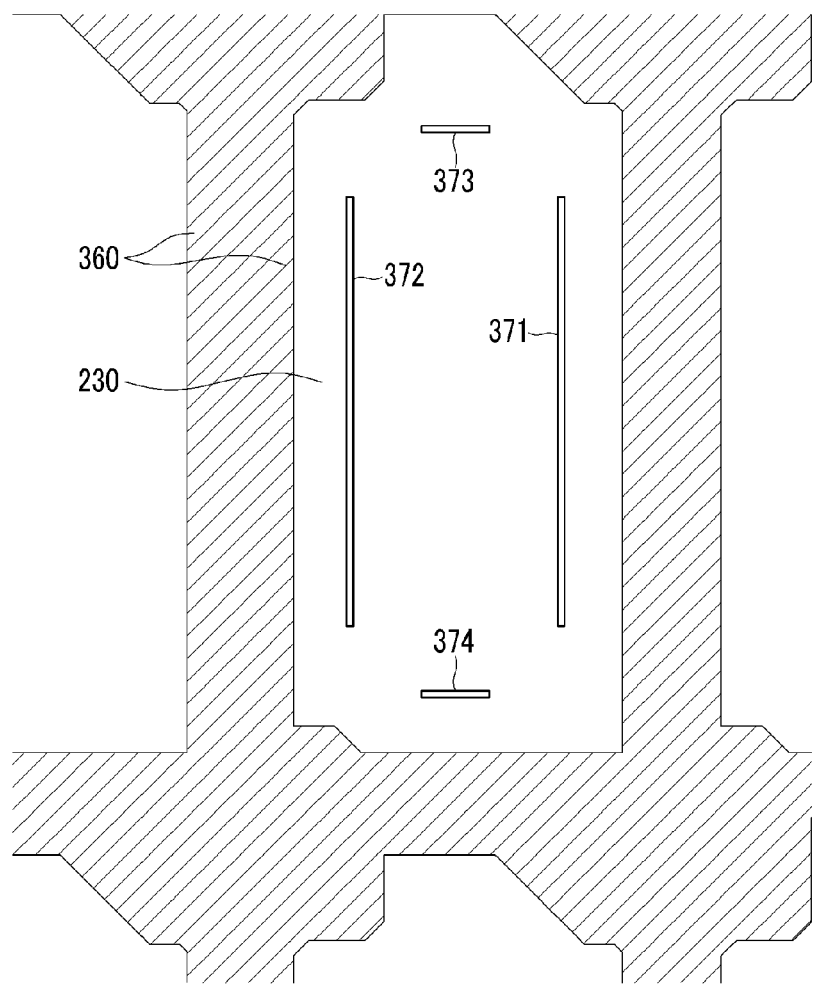
FIG. 8 is a layout view of a color filter array panel facing the thin film transistor array panel of FIG. 7.
Figure 9:
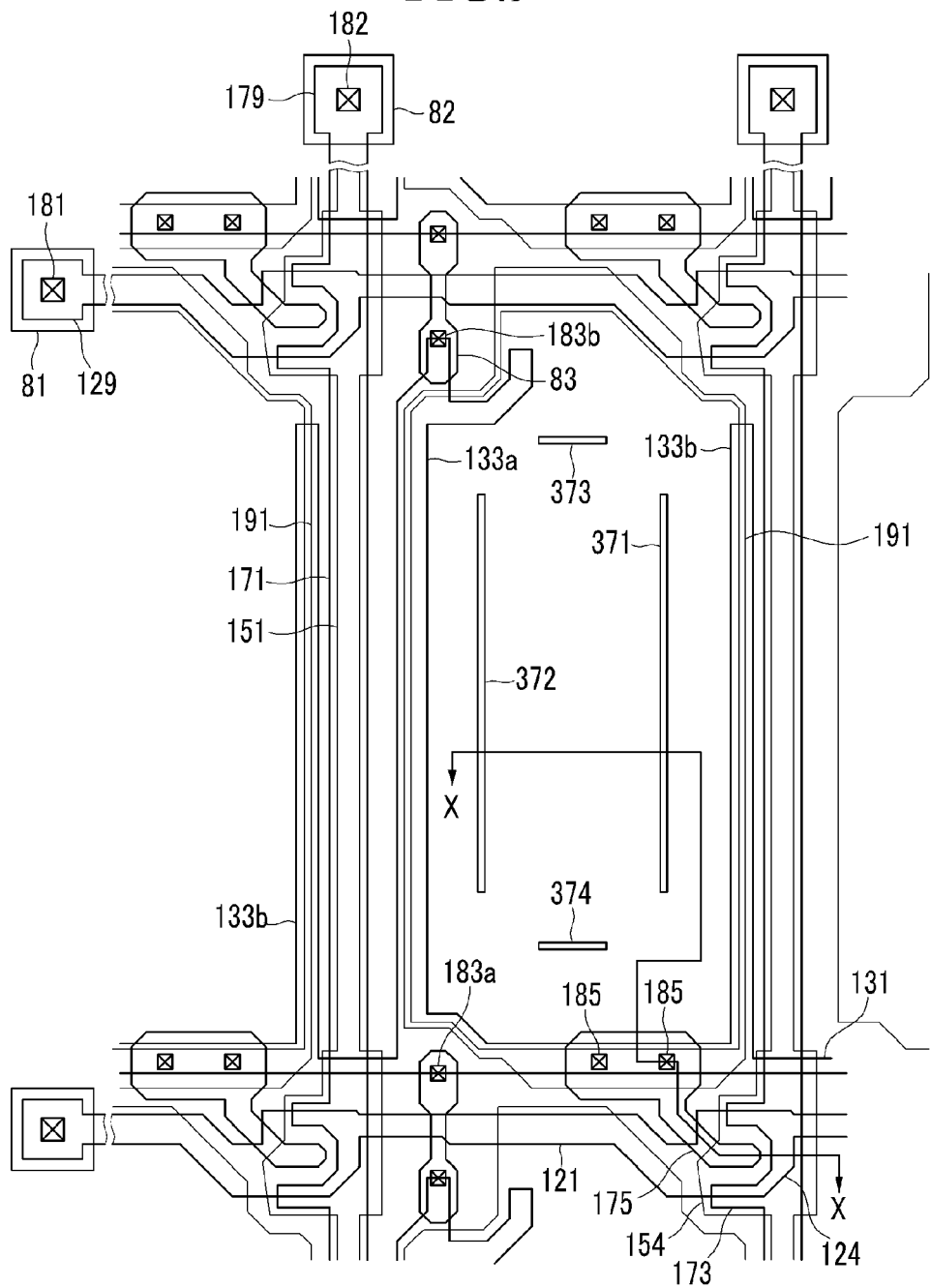
FIG. 9 is a layout view of a liquid crystal display including the thin film transistor array panel of FIG. 7 and the color filter array panel of FIG. 8.
Figure 10:
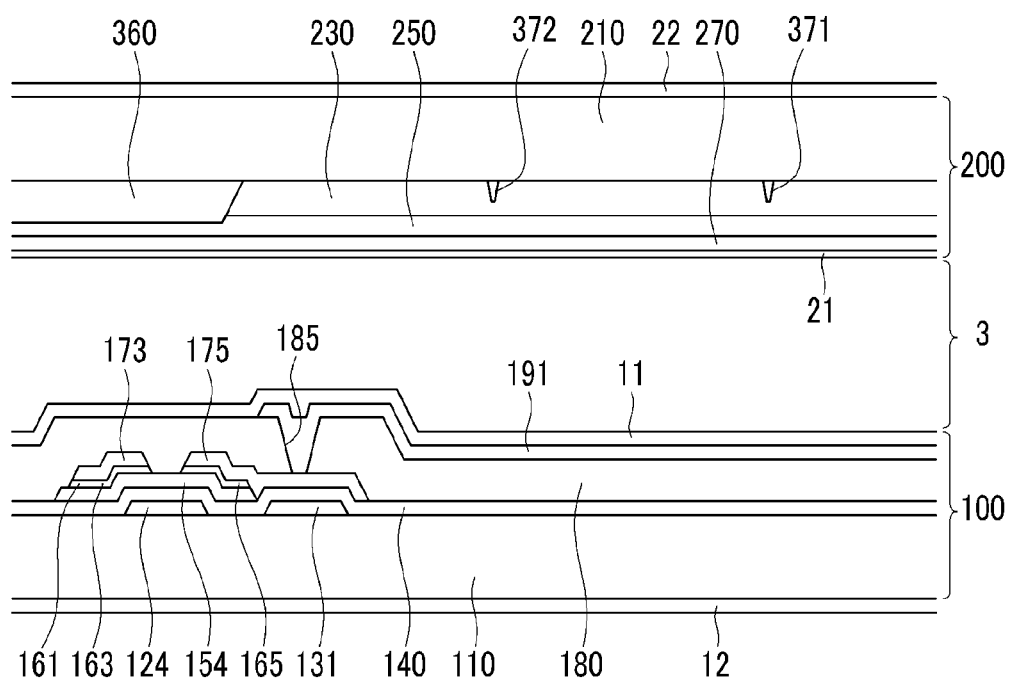
FIG. 10 is a cross-sectional view taken along line X-X shown in FIG. 9.

FIG. 7 is a layout view of a thin film transistor array panel of a liquid crystal display according to an exemplary embodiment of the present invention, FIG. 8 is a layout view of a color filter array panel facing the thin film transistor array panel of FIG. 7. FIG. 9 is a layout view of the liquid crystal display including the thin film transistor array panel of FIG. 7 and the color filter array panel of FIG. 8, and FIG. 10 is a cross-sectional view taken along line X-X shown in FIG. 9.

As shown in FIG. 7, FIG. 8, FIG. 9 and FIG. 10, the liquid crystal display includes the thin film transistor array panel 100, the color filter array panel 200 facing thereto, and a liquid crystal layer 3 interposed between the two display panels 100 and 200.

The thin film transistor array panel 100 will now be described with reference to FIG. 7, FIG. 9, and FIG. 10.

A plurality of gate lines 121 and a plurality of storage electrode lines 131 are formed on an insulation substrate 110 preferably made of transparent glass or plastic.

The gate lines 121 transmit gate signals and extend substantially in a transverse direction. Each gate line 121 includes a plurality of gate electrodes 124 protruding upward and downward, and an end portion 129 having a large area for connection with another layer or an external driving circuit. The storage electrode lines 131 receive a predetermined voltage and include a stem extending parallel to the gate lines 121, and a plurality of pairs of first storage electrodes 133a and second storage electrodes 133b branching off from the stem. Each of the storage electrode lines 131 is disposed between two adjacent gate lines 121, and its stem is placed closer to the lower of the two adjacent gate lines 121. Each of the storage electrodes 133a and 133b has a fixed end connected to the stem and a free end opposite to the fixed end. The fixed end of the first storage electrode 133a has a wide area, and the free end is divided into two portions of a straight portion and a bent portion. However, the shape and arrangement of the storage electrode lines 131 may be variously changed.

The gate lines 121 and the storage electrode lines 131 may be made of an aluminum-based metal of aluminum (Al) or aluminum alloys, a silver-based metal of silver (Ag) or silver alloys, a copper-based metal of copper (Cu) or copper alloys, a molybdenum-based metal of molybdenum (Mo) or molybdenum alloys, chromium (Cr), tantalum (Ta), titanium (Ti), etc. However, the gate lines 121 and the storage electrode lines 131 may have a multi-layered structure including two conductive films (not shown) having different physical characteristics. A gate insulating layer 140 made of a material such as silicon nitride (SiNx) or silicon oxide (SiOx) is formed on the gate lines 121 and the storage electrode lines 131.

A plurality of semiconductor stripes 151 that may be made of hydrogenated amorphous silicon (a-Si is an abbreviation for amorphous silicon), polysilicon, or so on, are formed on the gate insulating layer 140. The semiconductor stripes 151 generally extend in a longitudinal direction, and include a plurality of projections 154 that are extended toward the gate electrodes 124. Each semiconductor stripe 151 is increased in its width near the gate line 121 and the storage electrode line 131 to extensively cover them.

A plurality of ohmic contact stripes 161 and a plurality of ohmic contact islands 165 are formed on the semiconductor stripes 151. The ohmic contact stripes 161 and the ohmic contact islands 165 can be made of a material such as n+ hydrogenated amorphous silicon in which an n-type impurity such as phosphor is doped with a high density, or can be made of silicide. The ohmic contact stripes 161 include a plurality of projections 163, and the projections 163 and the ohmic contact islands 165 are disposed as pairs on the projections 154 of the semiconductor stripes 151.

A plurality of data lines 171 and a plurality of drain electrodes 175 are formed on the ohmic contact stripes 161 and the ohmic contact islands 165 and the gate insulation layer 140.

The data lines 171 transfer data signals and mainly extend in a longitudinal direction, thereby crossing the gate lines 121. Each data line 171 crosses a storage electrode line 131 and runs between adjacent sets of the first storage electrode 133a and the second storage electrode 133b. Each data line 171 includes a plurality of source electrodes 173 extending toward respective gate electrodes 124 and an end portion 179 with a wide area for connection with a different layer or an external driving circuit. The drain electrodes 175 are spaced apart from the data lines 171 and face the source electrodes 173 with respect to the gate electrodes 124. Each drain electrode 175 includes one end portion that is large and one end portion that has a bar shape. The large end portion overlaps with a storage electrode 131, and the bar-shaped end portion is partially surrounded by a source electrode 173 that is bent.

One gate electrode 124, one source electrode 173, and one drain electrode 175 constitute a thin film transistor (TFT) together with the projection 154 of the semiconductor stripe 151, and a channel of the TFT is formed at the projection 154 between the source electrode 173 and the drain electrode 175. Here, the gate electrode 124 may serve as a control terminal, the source electrode 173 may serve as an input terminal, and the drain electrode 175 may serve as an output terminal.

The data lines 171 and the drain electrodes 175 may be made of a refractory metal, such as molybdenum, chromium, tantalum, and titanium, or alloys thereof, and can have a multi-layer structure including a refractory metal film (not shown) and a low-resistance conductive layer (not shown).

The ohmic contact stripes 161 may exist only between the underlying semiconductor stripes 151 and the overlying data lines 171, the ohmic contact stripe projections 163 may exist only between the underlying semiconductor stripe projections 154 and the overlying source electrodes 173, and the ohmic contact islands 165 may exist only between the underlying semiconductor stripe projections 154 and the overlying drain electrodes 175 to lower contact resistance therebetween. Some portions of each semiconductor stripe 151, including, for example, a portion between the source electrode 173 and the drain electrode 175, are exposed, without being covered by the data line 171 and the drain electrode 175.

A passivation layer 180 is formed on the data lines 171, the drain electrodes 175, and the exposed portions of the semiconductor stripes 151. The passivation layer 180 may be made of an inorganic insulator or an organic insulation material, etc., and may have a planarized surface. The passivation layer 180 has a plurality of contact holes 182 exposing respective end portions 179 of the data lines 171 and a plurality of contact holes 185 exposing respective drain electrodes 175. The passivation layer 180 and the gate insulating layer 140 have a plurality of contact holes 181 exposing respective end portions 129 of the gate lines 121, a plurality of contact holes 183a exposing portions of respective storage electrode lines 131 near the fixed ends of the first storage electrodes 133a, and a plurality of contact holes 183b exposing respective portions of the free ends of the first storage electrodes 133a.

A plurality of pixel electrodes 191, a plurality of overpasses 83, and a plurality of contact assistants 81 and 82 are formed on the passivation layer 180. They may be made of a transparent conductive material such as indium tin oxide (ITO) or indium zinc oxide (IZO), or a reflective metal such as aluminum, silver, chromium, or alloys thereof.

The pixel electrode 191 is physically and electrically connected with the drain electrode 175 through the contact hole 185, and receives a data voltage from the drain electrode 175. The pixel electrode 191 applied with the data voltage generates an electric field along with a common electrode 270 of the common electrode panel 200 that receives a common voltage, to thereby determine a direction of the liquid crystal molecules (not shown) of the liquid crystal layer 3 between the two electrodes 191 and 270. Polarization of light that transmits through the liquid crystal layer is varied according to the determined direction of the liquid crystal molecules. The pixel electrode 191 and the common electrode 270 form a capacitor (referred to hereinafter as a "liquid crystal capacitor") to sustain the applied voltages even after the TFT is turned off.

The pixel electrode overlaps with the storage electrode line 131 as well as with the first storage electrode 133a and the second storage electrode 133b. A capacitor, referred to as a storage capacitor, is formed as the pixel electrode 191 and the drain electrode 175 electrically connected to the pixel electrode 191, overlapping with the storage electrode line 131. The storage capacitor enhances a voltage sustaining capability of the liquid crystal capacitor.

The contact assistant 81 is connected with the end portion 129 of the gate line 121 through the contact hole 181. The contact assistant 82 is connected with the end portion 179 of the data line 171 through the contact hole 182. The contact assistants 81 and 82 complement bonding characteristics of the end portion 129 of the gate line 121 and the end portion 179 of the data line 171 with an external device, and protect them.

The overpass 83, traversing the gate line 121, is connected with the exposed portion of the storage electrode line 131 via the contact hole 183a and the exposed end portion of the free end of the first storage electrode 133a via the contact hole 183b positioned at the other side of the gate line 121. The storage electrode line 131 as well as the first storage electrode 133a and the second storage electrode 133b can be used together with the overpass 83 to repair a defect of the gate line 121, the data line 171, or the TFT.

The color filter panel 200 will now be described with reference to FIG. 2, FIG. 3, FIG. 4, FIG. 5, FIG. 6, FIG. 7, FIG. 8, FIG. 9 and FIG. 10.

A partition 360 is formed on an insulation substrate 210 preferably made of transparent glass or plastic. The partition 360 may be made of a transparent organic material, and the partition 360 may have the same shape as the gate lines 121 and the data lines 171, thereby defining a pixel.

The partition 360 has a plurality of openings facing the pixel electrodes 191 that have substantially the same shape as the pixel electrodes 191. The partition 360 openings have a function of enclosing a color filter ink 231 in the manufacturing process of the color filter array panel using the inkjet method. A plurality of protrusion members 370 are formed with the same layer as the partition 360, and the protrusion members 370 may be made of the transparent organic material such as an acryl resin, a cardo resin, and a novolak resin such that the protrusion members 370 do not affect the transmittance.

The protrusion members 370 are formed inside the pixel defined by the partition 360. The protrusion members 370 include a left protrusion 372 disposed in the left side, a right protrusion 371 facing the left protrusion 372, an upper protrusion 373 disposed in the upper side, and a lower protrusion 374 facing the upper protrusion 373. The left protrusion 372, the right protrusion 371, the upper protrusion 373, and the lower protrusion 374 are not connected to each other. Accordingly, the movement of the color filter ink 231 dripped on the central portion inside the pixel is restricted by the protrusion members 370 in the upper direction, in the lower direction, in the right direction and the left direction inside the pixel, and the movement of the color filter ink 231 is relatively unrestricted in the corner directions of the pixel where the protrusion members 370 do not exist. Accordingly, the color filter ink 231 is filled with the same thickness on the whole inside of the pixel.

Most of the color filter 230 where the color filter ink 231 is filled inside the partition 360 exists in the regions enclosed by the partition 360, and may be extended in the longitudinal direction according to the column of the pixel electrodes 191. Each color filter 230 may display one of the primary colors, i.e., red, green, or blue.

An overcoat 250 is formed on the color filters 230 and the partition 360. The overcoat 250 may be made of an (organic) insulator, prevents the color filters 230 from being exposed, and provides a planarized surface. The overcoat 250 may be omitted.

A common electrode 270 is formed on the overcoat 250. The common electrode 270 is made of a transparent conductor such as ITO, IZO, or the like.

Alignment layers (not shown) are respectively coated on each of the inner surfaces of the two display panels 100 and 200, and may be horizontal or vertical alignment layers. Polarizers 12 and 22 are attached on each of the outer surfaces of the two display panels 100 and 200, and it is preferable that the transmissive axes of the two polarizers 12 and 22 are perpendicular and that one of the transmissive axes is parallel to the gate lines 121. In the case of a reflective LCD, one of the two polarizers 12 and 22 may be omitted.

The liquid crystal display according to the present exemplary embodiment may include a phase retardation film (not shown) for compensating delay of the liquid crystal layer 3. The liquid crystal display may include a backlight unit (not shown) for providing light to the polarizers 12 and 22, the phase retardation film, the display panels 100 and 200, and the liquid crystal layer 3.

In the exemplary embodiment, the liquid crystal display has the color filter formed in the display panel formed with the common electrode, however the present invention may be applied to a liquid crystal display where the color filter is formed in the thin film transistor array panel.

Figure 11:
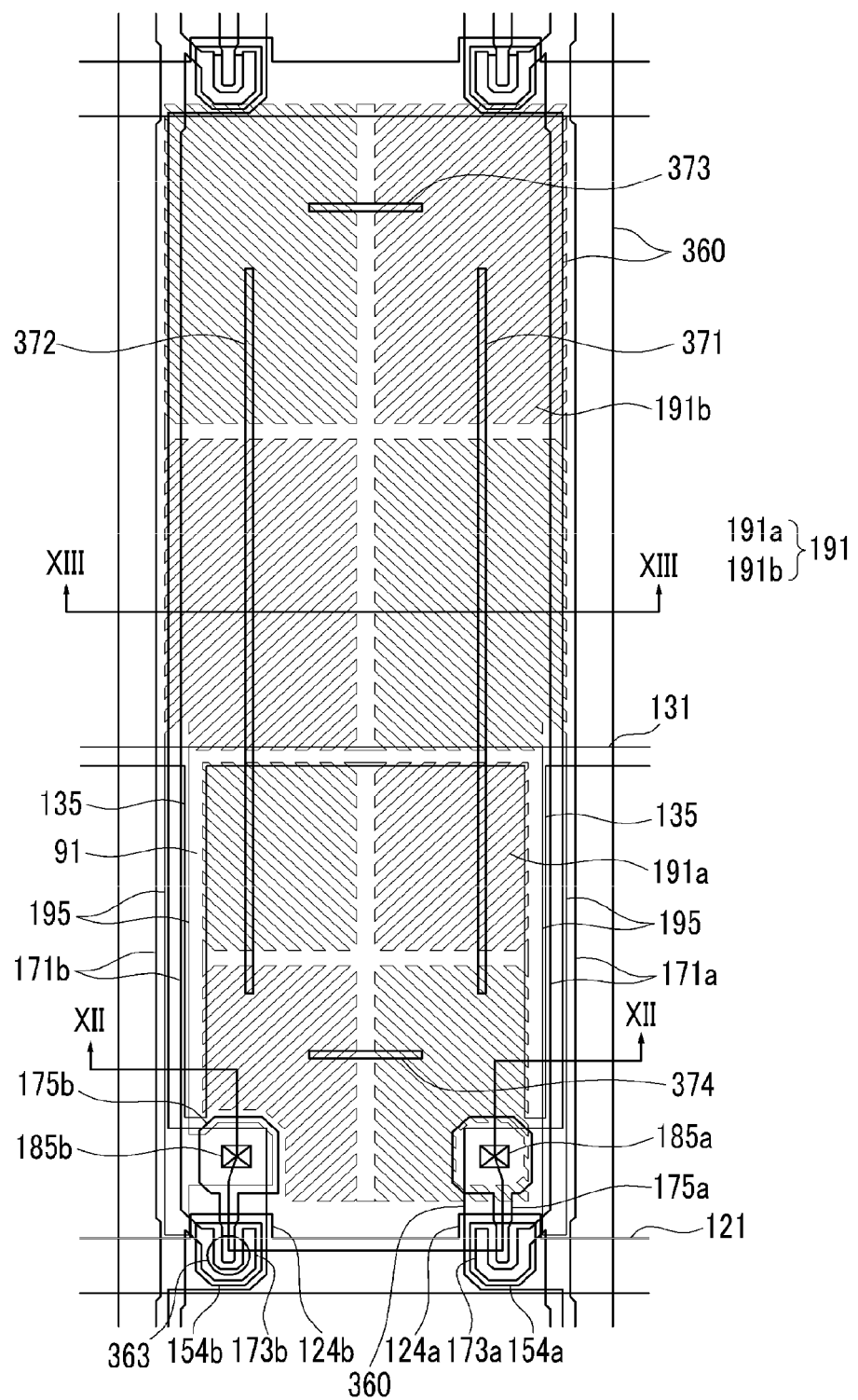
FIG. 11 is a layout view of a liquid crystal display according to another exemplary embodiment of the present invention.
Figure 12:
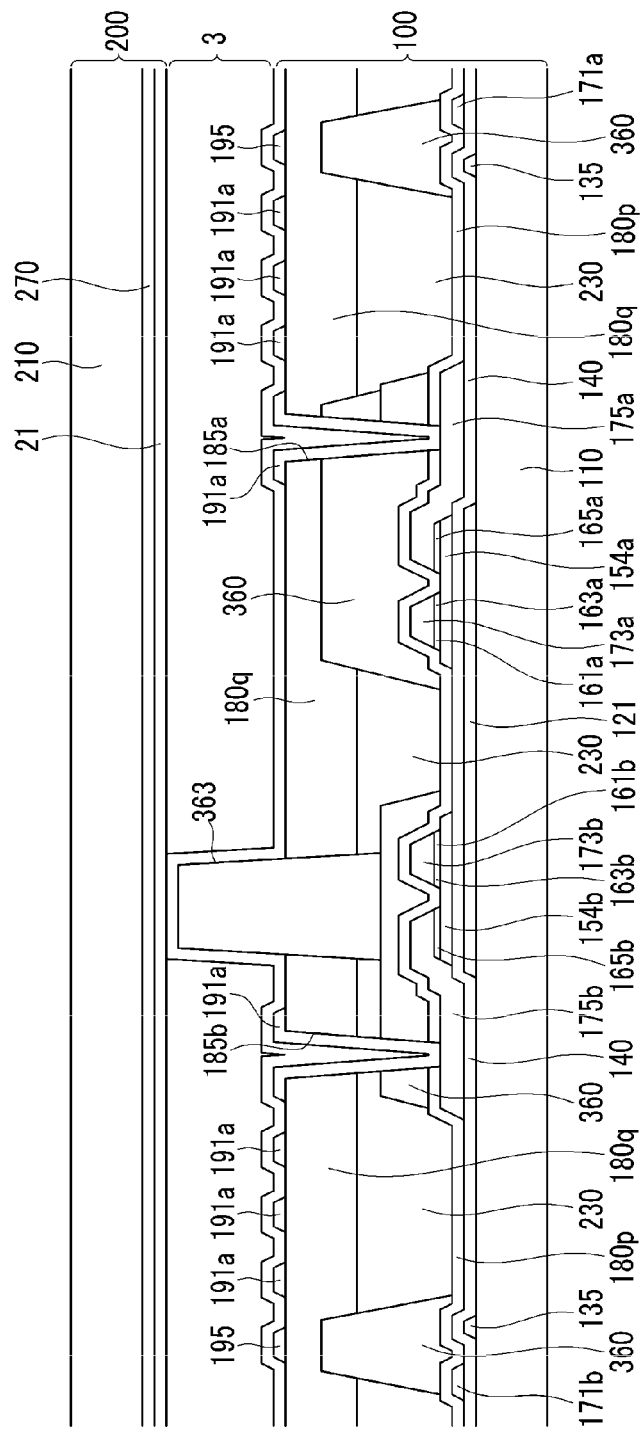
FIG. 12 is a cross-sectional view taken along line XII-XII shown in FIG. 1.
Figure 13:
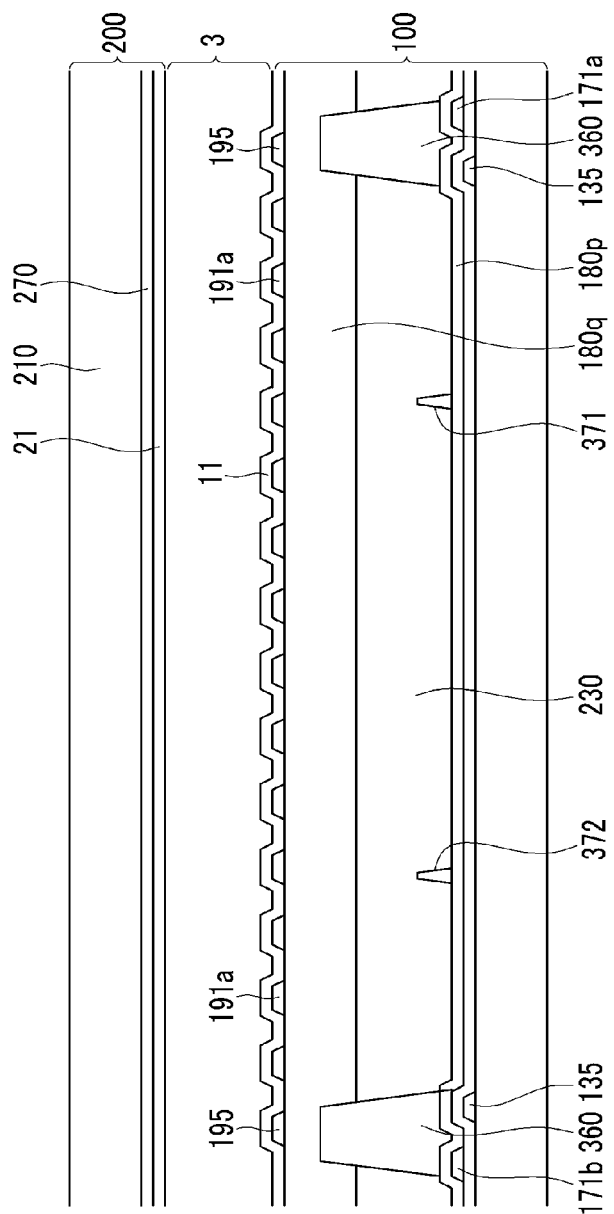
FIG. 13 is a cross-sectional view taken along line XIII-XIII shown in FIG. 1.

FIG. 11 is a layout view of a liquid crystal display according to another exemplary embodiment of the present invention, FIG. 12 is a cross-sectional view taken along line XII-XII shown in FIG. 11, and FIG. 13 is a cross-sectional view taken along line XIII-XIII shown in FIG. 11.

As shown in FIG. 11, FIG. 12 and FIG. 13, a liquid crystal display according to another exemplary embodiment of the present invention includes a lower panel 100 and an upper panel 200 facing each other, and a liquid crystal layer 3 interposed between the two display panels 100 and 200.

The lower panel 100 will now be described.

A plurality of gate lines 121 and a plurality of storage electrode lines 131 and 135 are formed on an insulation substrate 110. The gate lines 121 transmit gate signals and extend substantially in a transverse direction. Each gate line 121 includes a plurality of first gate electrodes 124a and second gate electrodes 124b protruding upward. The storage electrode lines include a stem 131 extending substantially parallel to the gate lines 121, and a plurality of storage electrodes 135 extended from the stem 131. However, the shape and arrangement of the storage electrode lines 131 and 135 may be variously changed.

A gate insulating layer 140 is formed on the gate lines 121 and the storage electrode lines 131 and 135, and a plurality of semiconductors 154a and 154b preferably made of amorphous or crystallized silicon are formed on the gate insulating layer 140.

A plurality of pairs of ohmic contacts include pairs of ohmic contact stripes 161a and 161b, pairs of ohmic contacts 163a and 165a formed on the semiconductor 154a, and pairs of ohmic contacts 163b and 165b formed on the semiconductor 154b. The plurality of pairs of ohmic contacts including the ohmic contact stripes 161a and 161b, the pair of ohmic contacts 163a and 165a, and the pair of ohmic contacts 163b and 165b may be formed of a material such as n+ hydrogenated amorphous silicon in which an n-type impurity is doped with a high concentration, or of a metal silicide.

A plurality of pairs of data lines 171a and 171b are formed on the ohmic contacts stripes 161a and 161b, on the ohmic contacts 163a, 163b, and on the gate insulating layer 140 and a plurality of pairs of first and second drain electrodes 175a and 175b are formed on the ohmic contacts 165a, and 165b, respectively, and on the gate insulating layer 140.

The data lines 171a and 171b extend substantially in the longitudinal direction, and cross the gate lines 121 and the stems of the storage electrode lines 131. The data line 171a includes a plurality of first source electrodes 173a and the second data line 171b includes a plurality of second source electrodes 173b extending toward the first gate electrode 124a and the second gate electrode 124b, respectively. The first source electrodes 173a and the second source electrodes 173b are curved with a "U" shape, and are opposite to the first drain electrodes 175a and the second drain electrodes 175b with respect to the first gate electrodes 124a and the second gate electrodes 124b, respectively.

Each first drain electrode 175a and second drain electrode 175b extends upward from one end portion enclosed by the respective first source electrode 173a and second source electrode 173b, to the other end portion having a wide area for connection with another layer. However, the shape and arrangement of the data lines 171a and 171b as well as the first drain electrodes 175a and the second drain electrodes 175b may be variously changed.

The first gate electrode 124a, the first source electrode 173a, and the first drain electrode 175a form a first thin film transistor (TFT) Qa along with the first semiconductor 154a. A channel of the first TFT Qa is formed on the first semiconductor island 154a between the first source electrode 173a and the first drain electrode 175a. The second gate electrode 124b, the second source electrode 173b, and the second drain electrode 175b form a second TFT Qb along with the second semiconductor 154b. A channel of the second TFT Qb is formed on the second semiconductor island 154b between the second source electrode 173b and the second drain electrode 175b.

The ohmic contacts 161a, 161b, 163a, 163b, 165a, and 165b are interposed only between the underlying semiconductor islands 154a and 154b, and the overlying data lines 171a and 171b, source electrodes 173a and 173b, and drain electrodes 175a and 175b, and reduce contact resistance between them. The semiconductor islands 154a and 154b have a portion that is exposed without being covered by the data lines 171a and 171b, source electrodes 173a and 173b and the drain electrodes 175a and 175b, and a portion between the source electrodes 173a and 173b and the drain electrodes 175a and 175b.

A lower passivation layer 180p, which may be made of silicon nitride or silicon oxide, is formed on the data lines 171a and 171b, the drain electrodes 175a and 175b, and the exposed portions of the semiconductor islands 154a and 154b.

A partition 360 is formed on the lower passivation layer 180p. The partition 360 may be made of the transparent organic material, and the partition 360 is formed according to the gate lines 121 and the data lines 171a and 171b and is formed on the thin film transistor. The region surrounded by the partition 360 is filled with a material for a color filter 230 and an upper passivation layer 180q, and is roughly rectangular-shaped.

The partition 360 has a plurality of openings facing the pixel electrodes 191 and has almost the same shape as the pixel electrodes 191, thereby having a function enclosing the color filter ink 231 in the manufacturing process of the color filter array panel using the inkjet method. A plurality of protrusion members 370 are formed with the same layer as the partition 360, and the protrusion members 370 may be made of the transparent organic material such as an acryl resin, a cardo resin, and a novolak resin such that the protrusion members 370 do not affect the transmittance.

The protrusion members 370 are formed inside the pixel defined by the partition 360. The protrusion members 370 include a left protrusion 372 disposed in the left side, a right protrusion 371 facing the left protrusion 372, an upper protrusion 373 disposed in the upper side, and a lower protrusion 374 facing the upper protrusion 373. The left protrusion 372, the right protrusion 371, the upper protrusion 373, and the lower protrusion 374 are not connected to each other. Accordingly, the movement of the color filter ink 231 dripped on the central portion inside the pixel is restricted by the protrusion members 370 in the upper direction, the lower direction, the right direction and the left direction inside the pixel, and the movement of the color filter ink 231 is relatively unrestricted in the corner directions of the pixel where the protrusion members 370 do not exist. Accordingly, the color filter ink 231 is filled with the same thickness on the whole inside of the pixel.

The color filter ink 231 is filled in the entire inside of the pixel, thereby forming the color filter 230. Here, the protrusion members 370 generate the color filter 230 with no difference in the thickness between the central portion and the edge portion of the color filter 230 such that the color reproducibility is not decreased.

The upper passivation layer 180q is formed on the color filter 230. The upper passivation layer 180q protects the color filter 230 and simultaneously planarizes the substrate 100. The lower passivation layer 180p may prevent the pigment of the color filter 230 from inflowing into the exposed semiconductor islands 154a and 154b.

The upper passivation layer 180q may be made of an organic material having photosensitivity. Also, the upper passivation layer 180q reduces the coupling effect between the pixel electrode 191, and the data lines 171a and 171b, and it is preferable that the thickness thereof is greater than 1.0 µm to provide the flat surface of the substrate.

The upper passivation layer 180q, the color filter 230, and the lower passivation layer 180p have a plurality of contact holes 185a and 185b exposing the drain electrodes 175a and 175b. A plurality of pixel electrodes 191 are formed on the upper passivation layer 180q. Each pixel electrode 191 includes a first subpixel electrode 191a and a second subpixel electrode 191b that are separated from each other with a gap 91 therebetween. The area occupied by the second subpixel electrode 191b may be larger than the area occupied by the first subpixel electrode 191a in the whole pixel electrode 191, and may be formed to have the area of the second subpixel electrode 191b be 1.0 to 2.2 times the area of the first subpixel electrode 191a.

The second subpixel electrode 191b includes a pair of branches 195 extending according to the data lines 171. The branches 195 are disposed between the second subpixel electrode 191b and the second source electrode 173b of the data lines 171, and the branches 195 are connected to each other on the lower portion of the second subpixel electrode 191b. One branch of two is expanded and is physically and electrically connected to the second drain electrode 175b through the contact hole 185b. Also, the first subpixel electrode 191a is connected to the first drain electrode 175a through the contact hole 185a.

The first and second subpixel electrodes 191a and 191b receive data voltages from the first and second drain electrodes 175a and 175b, respectively.

Next, the upper panel 200 will be described. In the upper panel 200, a common electrode 270 is formed on the whole surface of a transparent insulation substrate 210, and an alignment layer 21 is formed on the common electrode 270. Although not shown, a light blocking member may be additionally formed on the substrate 210. The additional light blocking member 11 may be formed on the lower substrate 110. A spacer 363 is used to maintain the interval between the upper panel 200 and the lower panel 100.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a substrate;
a partition disposed on the substrate and defining a pixel;
a plurality of protrusion members formed of the same material as the partition and disposed on the substrate, wherein the plurality of protrusion members are disposed inside the pixel defined by the partition, the plurality of protrusion members each comprising a linear plane shape, and the plurality of protrusion members not connected to each other; and
a color filter disposed inside the pixel defined by the partition,
wherein the color filter covers the plurality of protrusion members,
wherein the plurality of protrusion members comprise a left protrusion, a right protrusion facing the left protrusion, an upper protrusion, and a lower protrusion facing the upper protrusion, and
wherein the left protrusion and the right protrusion are disposed between the upper protrusion and the lower protrusion.

2. The liquid crystal display of claim 1, wherein:
the plurality of protrusion members comprises a transparent organic material.

3. The liquid crystal display of claim 1, wherein:
the plurality of protrusion members disposed inside the pixel are spaced apart from the partition defining the pixel.

4. The liquid crystal display of claim 1, wherein the plurality of protrusion members comprises a first pair of protrusion members facing each other and a second pair of protrusion members facing each other, and
wherein the lengths of the first pair of protrusion members are longer than that of the second pair of protrusion members.

5. The liquid crystal display of claim 1, wherein
the lengths of the upper protrusion and the lower protrusion are shorter than the length of a first side of the pixel, and the lengths of the left protrusion and the right protrusion are shorter than the length of a second side of the pixel.

6. The liquid crystal display of claim 1, wherein:
the plurality of protrusion members are not disposed at positions corresponding to corners of the pixel defined by the partition.

7. The liquid crystal display of claim 6, wherein:
an upper end and a lower end of the left protrusion are not connected to a left end of the upper protrusion and a left end of the lower protrusion; and
an upper end and a lower end of the right protrusion are not connected to a right end of the upper protrusion and a right end of the lower protrusion.

8. The liquid crystal display of claim 7, wherein:
the left protrusion, the right protrusion, the upper protrusion, and the lower protrusion respectively comprise a linear shape.

9. The liquid crystal display of claim 8, wherein:
the left protrusion, the right protrusion, the upper protrusion, and the lower protrusion together form a rectangle without corners.

10. The liquid crystal display of claim 7, wherein:
the left protrusion, the right protrusion, the upper protrusion, and the lower protrusion are respective circular arcs that are convex with respect to the partition.

11. The liquid crystal display of claim 10, wherein:
the left protrusion, the right protrusion, the upper protrusion, and the lower protrusion together form an oval shape, and are not connected to each other at positions corresponding to the corners of the pixel defined by the partition.

12. The liquid crystal display of claim 7, wherein:
the left protrusion, the right protrusion, the upper protrusion, and the lower protrusion are respective circular arcs that are concave with respect to the partition.

13. The liquid crystal display of claim 12, wherein:
the left protrusion, the right protrusion, the upper protrusion, and the lower protrusion each comprise a plurality of protrusions; and
the length of each protrusion within each plurality of protrusions is different from the other protrusions in the plurality of protrusions.

14. The liquid crystal display of claim 13, wherein:
the length of each protrusion increases close to the edge of the pixel.

15. The liquid crystal display of claim 13, wherein:
the height of each protrusion is less than half the height of the partition.

16. The liquid crystal display of claim 13, wherein:
the line width of each protrusion is less than the line width of the partition.

17. A liquid crystal display, comprising:
a substrate comprising a thin film transistor;
a partition disposed on the substrate and defining a pixel;
a plurality of protrusion members formed of the same material as the partition and disposed on the substrate, wherein the plurality of protrusion members are disposed inside the pixel defined by the partition, and the plurality of protrusion members are not connected to each other; and
a color filter disposed inside the pixel defined by the partition,
wherein the protrusion members are not disposed at positions corresponding to the corners of the pixel defined by the partition,
wherein the color filter covers the plurality of protrusion members,
wherein the plurality of protrusion members comprise a left protrusion, a right protrusion facing the left protrusion, an upper protrusion, and a lower protrusion facing the upper protrusion, and
wherein the left protrusion and the right protrusion are disposed between the upper protrusion and the lower protrusion.

18. The liquid crystal display of claim 17, wherein:
the plurality of protrusion members disposed inside the pixel are spaced apart from the partition defining the pixel.

19. A liquid crystal display, comprising:
a thin film transistor array panel, comprising:
a lower substrate,
a gate line extending in a first direction and disposed on the lower substrate, a data line disposed on the lower substrate and extending in a second direction to cross with the gate line, a thin film transistor disposed on the lower substrate, the thin film transistor comprising a control terminal connected to the gate line, an input terminal connected to the data line, and an output terminal, and a pixel electrode disposed on the thin film transistor;

a color filter array panel, comprising:

an upper substrate facing the thin film transistor array panel, a partition comprising the same pattern as the gate line and the data line, the partition being disposed on the upper substrate and defining a pixel, a plurality of protrusion members disposed on the upper substrate, wherein the plurality of protrusion members are disposed inside the pixel defined by the partition and the plurality of protrusion members are not connected to each other, a color filter disposed inside the pixel defined by the partition, and a common electrode disposed on the color filter; and a liquid crystal layer disposed between the thin film transistor array panel and the color filter array panel, wherein the protrusion members are not disposed at positions corresponding to corners of the pixel defined by the partition, wherein the color filter covers the plurality of protrusion members, wherein the plurality of protrusion members comprise a left protrusion, a right protrusion facing the left protrusion, an upper protrusion, and a lower protrusion facing the upper protrusion, and wherein the left protrusion and the right protrusion are disposed between the upper protrusion and the lower protrusion.

20. The liquid crystal display of claim 19, wherein:

the plurality of protrusion members disposed inside the pixel are spaced apart from the partition defining the pixel.

\* \* \* \* \*